4 Sheets—Sheet 1.
W. BELL.
Dumping-Wagon.
No. 14,301. Patented Feb. 26, 1856.
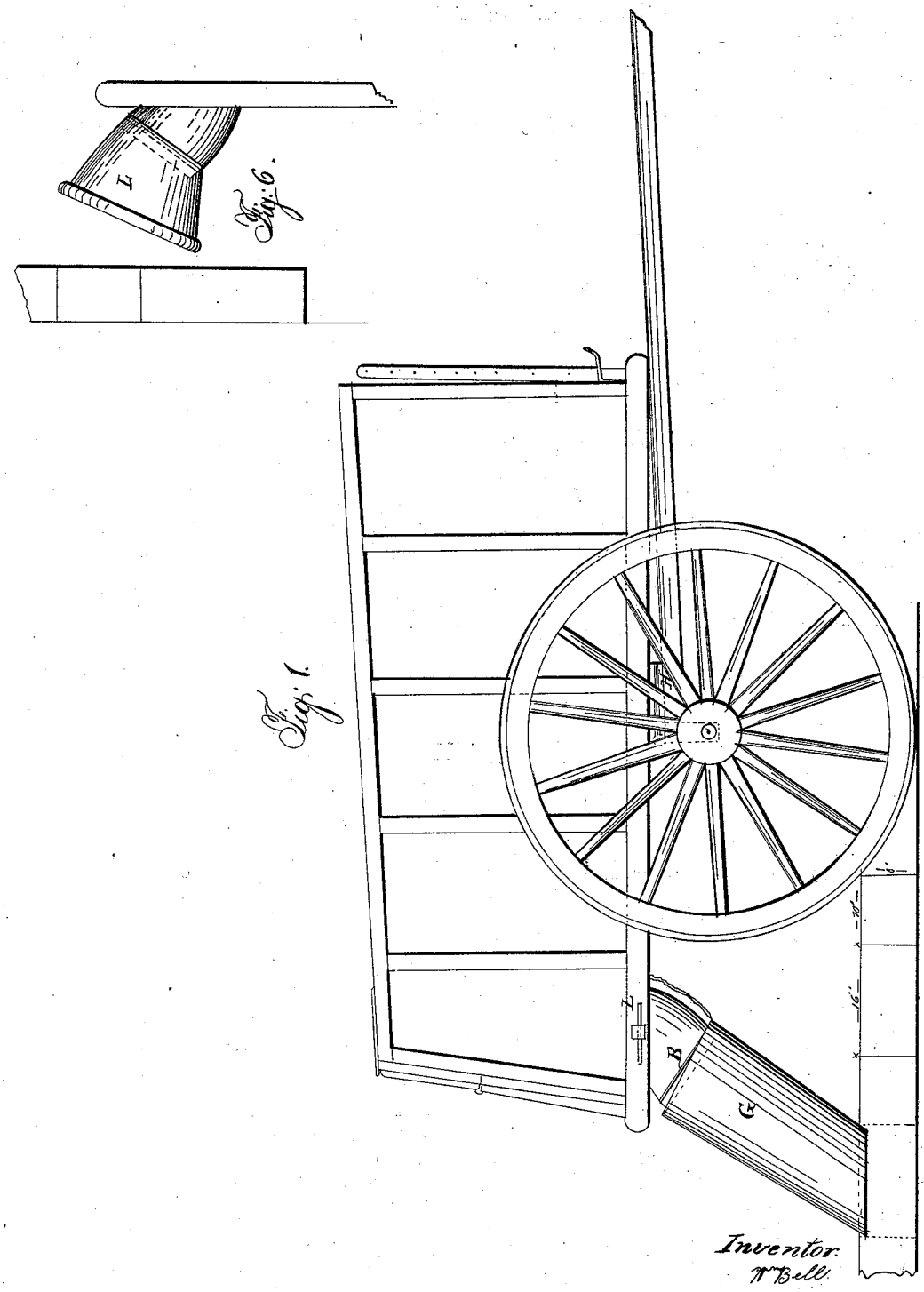

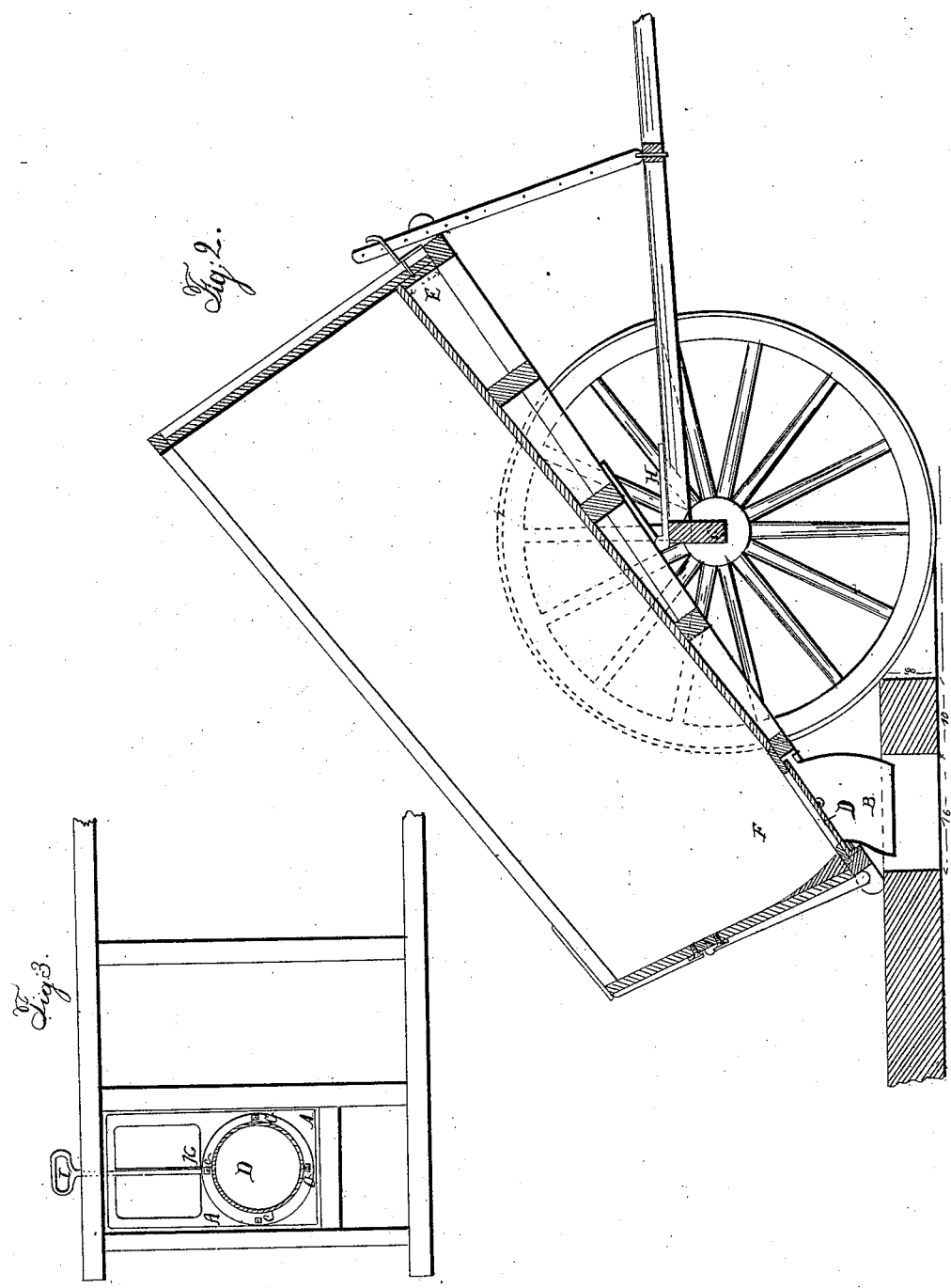

W. BELL.
Dumping-Wagon
No. 14,301.
4 Sheets—Sheet 3.
Patented Feb. 26, 1856.
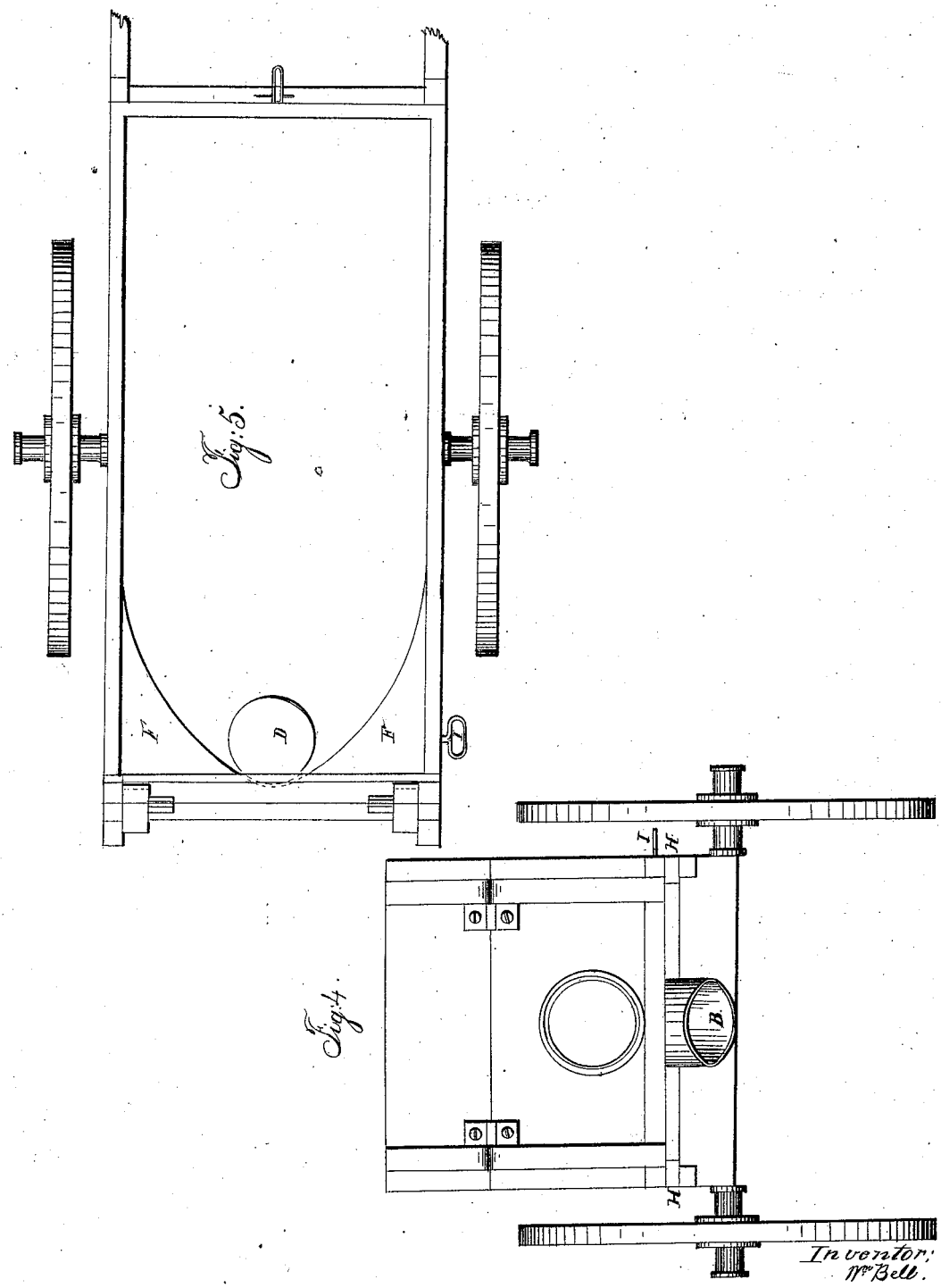

W. BELL.
Dumping-Wagon.
No. 14,301.
4 Sheets—Sheet 4.
Patented Feb. 26, 1856.
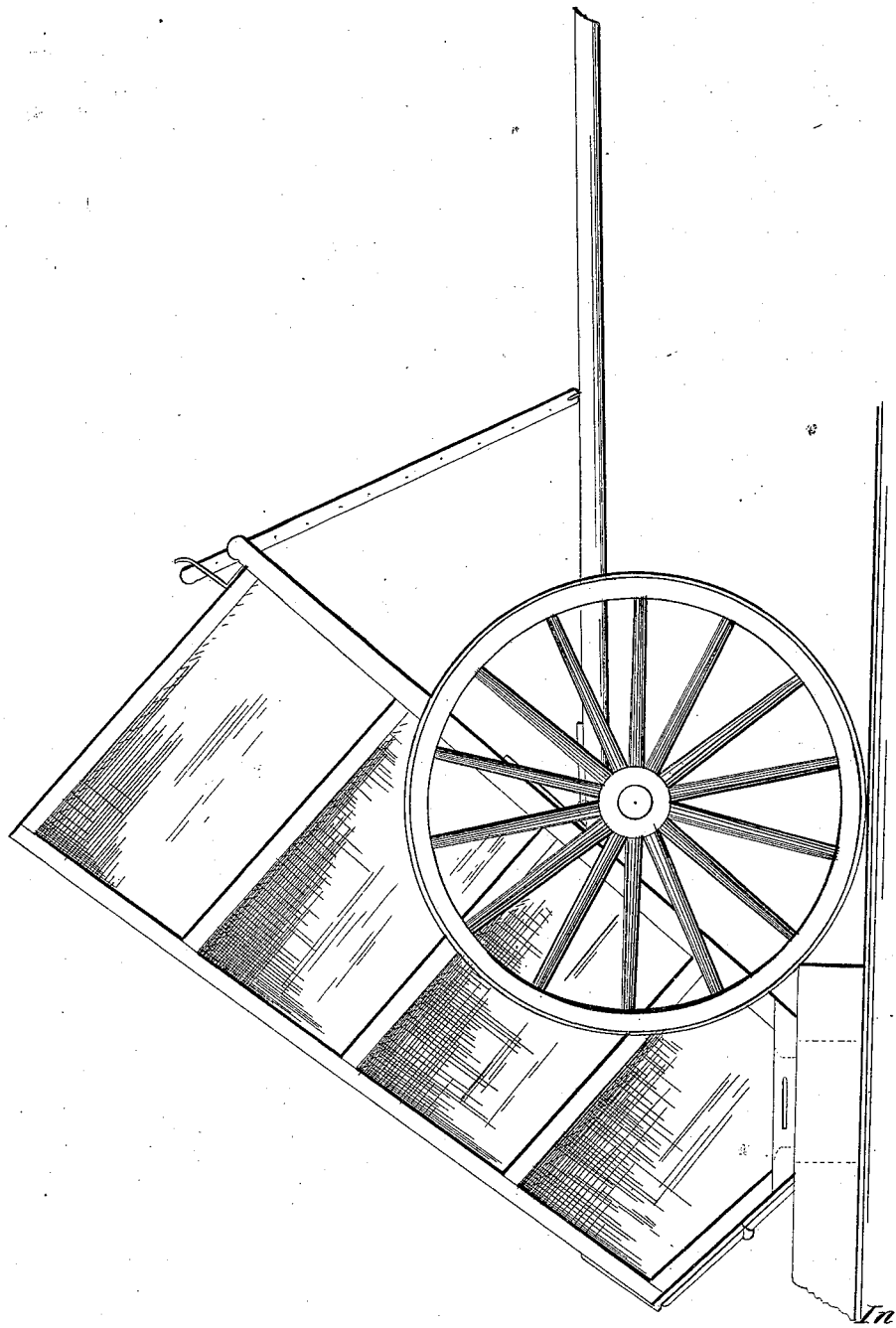
Inventor
Wm Bell

UNITED STATES PATENT OFFICE.

WM. BELL, OF BOSTON, MASSACHUSETTS.

MACHINE FOR DEPOSITING COAL IN CELLARS.

Specification of Letters Patent No. 14,301, dated February 26, 1856.

*To all whom it may concern:*

Be it known that I, WILLIAM BELL, of Boston, county of Suffolk, and State of Massachusetts, have invented a new and Improved Method of Depositing Anthracite and Bituminous Coal in Cellars from Carts and other Vehicles Through Scuttles in Sidewalks; and I hereby declare the following is a full and exact description of my invention, reference being had to the accompanying drawings and to the letters of reference marked thereon.

The nature of my invention consists of providing a conductor manufactured of iron, wood or other material and attaching the same to a hole in the bottom of a cart or other vehicle of sufficient diameter to allow coal to pass through the same and through the coal-scuttle in a side-walk without dropping it upon the side-walk as heretofore practised to the very great annoyance of pedestrians who promenade the sidewalk, and without subjecting the purchaser to unnecessary additional expense.

To enable others skilled in the art to make and use my invention I will proceed to describe its construction and operation.

On the under side of a cart, wagon or sled and near the tail end of the same, I have attached a bed-plate, see A in the accompanying drawing, Figure 3, of cast iron, about thirty three inches in length, sixteen inches in width and about half an inch in thickness which is confined to the frame of the cart by bolts and screws. In this bed-plate I have made a hole twelve inches in diameter to which I have attached an iron conductor B Figs. 1, 2, 4 of corresponding diameter by bolts which pass through the bed-plate and flange of the conductor, and are confined on the underside of the cart by screws, C Fig. 3, the conductor being about fifteen inches in length. Directly over the hole in the bed-plate I have made a hole of the same diameter in the floor of the cart between which and the bed-plate I have constructed a slide D Figs. 3, 5 which plays between flanges cast upon the bed-plate, and near the edges of the same. If the vehicle be a cart (see drawing) it will not be necessary to raise the front part of it the usual distance from a level in order that an entire load of coal may slide to the tail end of the cart, as I make the forward end of the floor E, Fig. 2, of the cart six or seven inches higher than the tail end of the same; six feet of the body of the cart being an inclined plane. I have constructed a tail-board so that the top of it has an inward inclination that when the forward end of the cart is elevated, no coal shall rest upon the tail-board when other portions of the cart are vacated. The lower part of this tail-board is stationary; the upper portion is attached to the lower by hinges Fig. 2. I have also put such obstructions in the corners of the cart on both sides of the outlet F Figs. 2 5 as will prevent the coal from lodging there. It is proper that the outer edge of the coal-scuttle in the side-walk be tin, and not exceeding twelve inches from the edge of the side-walk, and the hole in the side-walk sixteen inches in diameter, or at least three inches larger than the diameter of the conductor, be it more or less; also that the side walk be elevated eight inches from the street, this being about the average elevation of side-walks. Should the side-walk in any street essentially vary from this elevation, or should any coal-scuttle be at a less or greater distance from the side walk than twelve inches, I remedy the evil in the one case by placing the wheels of the cart at a proper distance from the side-walk and trigging them there so that the conductor shall be directly over or within the scuttle when the front of the cart is elevated; or in the other case by attaching, with convenient fastenings, a sheet iron tube G Fig. 1 to the conductor and letting the cart remain on a level or otherwise so that the tube shall convey the coal into the scuttle if within convenient distance; but to realize all the advantage which can be derived from my invention without the use of a shovel in discharging coal from a cart, there should be a uniformity in accordance with the rules herein specified with respect to the size of coal scuttles and their distance from the edge of the side-walk. A cart adapted to these rules I make about eight feet and seven inches in length at the bottom, the width being three feet and ten inches more or less, and hang it in the middle to the axletree with wrought iron hinges H Figs. 1 2 4. I make the wheels of the cart five feet in diameter, and raise the cart upon the axletree so that its elevation from the ground shall be three feet and three inches. I make the sides of the cart so as to have a uniform depth, being six or seven inches higher at the forward end of the cart than at the rear to correspond with the floor of the cart. When the cart is placed in a favorable position for discharging the coal, the slide is drawn out by a rod having a convenient handle I Figs. 1 3 4 5 7 which rod is attached to the slide at K, that the full size of the hole in the cart may be opened for the egress of the coal. When the hole in the sidewalk is of less size than one foot in diameter, a flexible tube L Fig. 6 made of Russia duck and attached to the conductor by an india rubber band inclosed in the hem of the tube may be used to prevent the coal from being scattered upon the side-walk, the lower end of the tube being of sufficient diameter to surround the scuttle; a hard rope should be inclosed in the lower hem that it may maintain a circular form while resting upon the side-walk and inclosing the scuttle. When it becomes necessary to use this flexible tube the slide should not be wholly withdrawn.

What I claim as my invention and wish to secure by Letters Patent is—

The bed-plate, conductor and slide with the tube attachments in connection with a hole in the cart or other vehicle as set forth.

WM. BELL.

In presence of—
  F. W. SAWYER,
  H. Y. CUMMINS.